(12) United States Patent
Palmieri et al.

(10) Patent No.: US 10,369,767 B2
(45) Date of Patent: Aug. 6, 2019

(54) BLOCKING/DEBLOCKING RESIN SYSTEMS FOR USE AS A "CO-CURE-PLY" IN THE FABRICATION OF LARGE-SCALE COMPOSITE STRUCTURE

(71) Applicant: U.S.A. as represented by the Administrator of the National Aeronautics and Space Administration, Washington, DC (US)

(72) Inventors: Frank L. Palmieri, Hampton, VA (US); John W. Connell, Yorktown, VA (US); Christopher J. Wohl, Jr., Portsmouth, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 118 days.

(21) Appl. No.: 15/274,147

(22) Filed: Sep. 23, 2016

(65) Prior Publication Data

US 2017/0080685 A1    Mar. 23, 2017

Related U.S. Application Data

(60) Provisional application No. 62/385,012, filed on Sep. 8, 2016, provisional application No. 62/222,365, filed on Sep. 23, 2015.

(51) Int. Cl.
*B32B 7/12* (2006.01)
*B29C 70/30* (2006.01)
(Continued)

(52) U.S. Cl.
CPC ............... *B32B 7/12* (2013.01); *B29C 65/02* (2013.01); *B29C 65/4835* (2013.01);
(Continued)

(58) Field of Classification Search
None
See application file for complete search history.

(56) References Cited

U.S. PATENT DOCUMENTS

2015/0056433 A1* 2/2015 MacAdams ............... B32B 7/06
                                                                  428/221
2016/0121591 A1   5/2016 MacAdams et al.

FOREIGN PATENT DOCUMENTS

GB              960236 A  *  6/1964  ......... C08G 59/4042

OTHER PUBLICATIONS

Center for Independent Research & Development LaRC IRAD Program, "Co-Cure-Poly Resins for High Performance, Large-Scale Structures Projects," Oct. 23, 2015, 5 pages.

* cited by examiner

*Primary Examiner* — Randy P Gulakowski
*Assistant Examiner* — Ha S Nguyen
(74) *Attorney, Agent, or Firm* — Jennifer L. Riley; Robin W. Edwards; Mark P. Dvorscak

(57) ABSTRACT

A method for bonding composite structures which includes providing a first and second composite substrate and coupling a co-cure prepreg tape having chemically protected polymerizable functional groups onto a surface of both the first and second composite substrates. The first and second composite substrates are then cured to the co-cure prepreg tape at a first temperature to form a co-cure prepreg tape portion where the first and second composite substrates are fully cured and the co-cure prepreg tape is partially cured. The co-cure prepreg tape portion of the first composite substrate is then coupled to the co-cure prepreg tape portion of the second composite substrate and a deprotection initiator is applied to facilitate deprotection of the chemically protected polymerizable functional groups and cure the co-cure prepreg tape portion of the first and second composite substrates to form a single covalently bonded composite structure.

20 Claims, 11 Drawing Sheets

(51) Int. Cl.
  *B29C 65/00* (2006.01)
  *B29C 65/48* (2006.01)
  *B29C 65/50* (2006.01)
  *C09J 5/06* (2006.01)
  *B29C 65/02* (2006.01)
  *B32B 27/34* (2006.01)
  *B29C 65/14* (2006.01)

(52) U.S. Cl.
  CPC ...... *B29C 65/5014* (2013.01); *B29C 65/5057* (2013.01); *B29C 66/0242* (2013.01); *B29C 66/1122* (2013.01); *B29C 66/43* (2013.01); *B29C 66/71* (2013.01); *B29C 66/721* (2013.01); *B29C 66/73752* (2013.01); *B29C 66/73754* (2013.01); *B29C 66/73941* (2013.01); *B29C 66/919* (2013.01); *B29C 66/91445* (2013.01); *B29C 66/91921* (2013.01); *B29C 70/30* (2013.01); *B32B 27/34* (2013.01); *C09J 5/06* (2013.01); *B29C 65/14* (2013.01); *B29C 66/81455* (2013.01); *B32B 2305/74* (2013.01); *B32B 2305/77* (2013.01); *B32B 2309/02* (2013.01)

Secondary Bond

Co-Bond

Co-cure

BLOCKING/DEBLOCKING RESIN SYSTEMS FOR USE AS A "CO-CURE-PLY" IN THE FABRICATION OF LARGE-SCALE COMPOSITE STRUCTURE

CROSS-REFERENCE TO RELATED PATENT APPLICATION(S)

This patent application claims the benefit of and priority to U.S. Patent Application No. 62/222,365 filed on Sep. 23, 2015 and to U.S. Patent Application No. 62/385,012 filed on Sep. 8, 2016, the contents of each of the preceding applications is hereby incorporated by reference in their entireties.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

The adhesive bonding of composite structures, in particular large or complex structures, is predominantly performed using one of three approaches: 1) secondary bonding; 2) co-bonding; and 3) co-curing. Secondary bonding (shown in FIG. 1A) is the joining together of pre-cured composite parts by adhesive bonding, wherein only the adhesive is being cured. This secondary bonding method typically requires surface preparation of each previously cured composite part at the bonding surfaces to form a strong link. Co-bonding (shown in FIG. 1B) involves joining a pre-cured composite part to an uncured composite part by adhesive bonding, wherein the adhesive and the uncured composite part are being cured during the bonding process. The pre-cured composite usually requires an additional surface preparation step prior to adhesive bonding. The last approach, co-curing (shown in FIG. 1C) joins uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials in the co-cure method are frequently difficult to handle. For example, it is difficult to assemble and bond uncured composite materials on tools with complex three-dimensional shapes.

In the aerospace industry, airframe manufacturers making large-scale composite structures commonly apply secondary bonding techniques to join the molded and cured thermoset components. Secondary bonding, while highly effective in most cases, sometimes results in a weak bond at the adhesive/adherent interface. Due to the unpredictable nature of the interface, the Federal Aviation Administration (FAA) certification of primary structures with secondary bonds requires that aircraft manufacturers incorporate redundant load paths accomplished mostly by adding mechanical fasteners. Airframe manufacturers using the secondary bonding approach must additionally install mechanical fasteners on adhesively bonded joints to comply with federal aviation regulations. An average commercial aircraft may contain up to several miles of adhesively bonded joints and thousands of redundant fasteners. An alternate means of assembling large-scale composite structures to meet federal regulations is needed to realize the ultimate potential of composites to reduce cost and increase aircraft performance. In some applications, by removing redundant fasteners in an aircraft, one may reduce the part count by up to 120,000 parts and the weight of the aircraft by up to 5000 lbs. (2%).

The use of secondary bonding and co-bonding techniques frequently result in unpredictable joint strengths that require the addition of mechanical fasteners while the use of the co-cure process is limited by the complexity of the part or the size of the autoclave or oven being used to mold and cure the part. A need exists for alternative manufacturing methods to fabricate unitized composite structures with reliable, certifiable joints without the need for redundant mechanical fasteners.

BRIEF SUMMARY OF THE INVENTION

The present invention is a method for bonding composite substrates including: providing a first composite substrate and a second composite substrate wherein both the first composite substrate and the second composite substrate are uncured or partially cured and include one or more reinforcement fibers and a first curable resin; coupling a co-cure prepreg tape onto a faying surface of both the first and second composite substrates wherein the co-cure prepreg tape has a second curable resin having one or more chemically protected polymerizable functional groups; curing the first and second composite substrates to the co-cure prepreg tape at a first temperature to form a co-cure prepreg tape portion wherein the first and second composite substrates are fully cured and the co-cure prepreg tape is partially cured; coupling the co-cure prepreg tape portion of the first composite substrate to the co-cure prepreg tape portion of the second composite substrate; applying a second temperature to facilitate deprotection of the chemically protected polymerizable functional groups to give unprotected polymerizable functional groups and cure the co-cure prepreg tape portion of the first composite substrate to the co-cure prepreg tape portion of the second composite substrate to form a single covalently bonded composite structure.

In another embodiment, the present invention provides a method for bonding composite substrates including: providing a co-cure prepreg layer cured to a surface of both a first composite substrate and a second composite substrate wherein the co-cure prepreg layer includes a chemically protected polymerizable functional group; coupling a portion of the co-cure prepreg layer cured to the first composite substrate to a portion of the co-cure prepreg layer cured to the second composite substrate; applying a deprotection initiator to deprotect the protected polymerizable functional group of the co-cure prepreg layers and to couple the co-cure prepreg layers of the first and second composite substrates, to form a single covalently bonded composite structure.

In yet another embodiment, the invention is a co-curable composite structure including: an uncured or partially cured composite substrate having one or more reinforcement fibers and a first curable resin wherein the first curable resin includes a first epoxide and an amine; a co-cure prepreg layer on a surface of the uncured or partially cured composite substrate wherein the co-cure prepreg layer includes a second curable resin having a second epoxide and a protected amine; wherein the uncured or partially cured composite substrate and the co-cure prepreg layer are cured together at a first temperature until the uncured or partially cured composite structures and the co-cure prepreg layer are functionally fully cured to form the co-curable composite structure; and wherein the protected amine of the co-cure prepreg layer remains latent until a deprotection and co-cure step.

These and other features, advantages, and objects of the present invention will be further understood and appreciated by those skilled in the art by reference to the following specification, claims, and appended drawings.

DETAILED DESCRIPTION OF THE INVENTION

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

There are typically three standard methods of assembling composite structures: secondary bonding, co-bonding, and co-curing. These currently used methods result in structures that are either restricted by size and complexity or subject to performance-hampering safety modifications. This disclosure introduces and advances a modified co-cure method for the assembly of large-scale composite structures in compliance with safety regulations without the need or requirement of redundant mechanical fasteners. Multifunctional epoxy resins are disclosed herein that produce fully-cured subcomponents with uncured joining surfaces, enabling these uncured joining surfaces to be assembled by co-curing in a subsequent out-of-autoclave process. Although many different functional groups could be selected and used for the methods disclosed herein, aromatic diamines and amines were chosen and protected using ketones or aldehydes to form imines.

Primary amines are known in the art to be common hardeners for epoxies used in thermoset composites. Using protection chemistry, primary amines can undergo a reversible reaction to form imines. Imine protected hardeners laminated onto a joining surface of a composite substrate will inhibit crosslinking while the remainder of the unprotected amines will fully cure. The uncured surface made up of the protected imines can then be activated through hydrolytic deprotection through the addition of water. This deprotected uncured surface can then be co-cured or joined to another uncured, activated surface resulting in a seamless joint on the final composite structure. Assemblies made by co-curing, until now limited in size and manufacturing complexity, result in predictable structures that are certifiable for commercial aviation without redundant mechanical fasteners reducing the part count by up to about 120,000 parts and the weight by up to about 5000 lbs (2%) in a largely-composite, commercial transport aircraft.

The term, "co-curing," as used herein, is defined as joining uncured composite parts by simultaneously curing, wherein the composite parts are being cured together, through covalent chemical bonding without an adhesive.

Figure 1A:
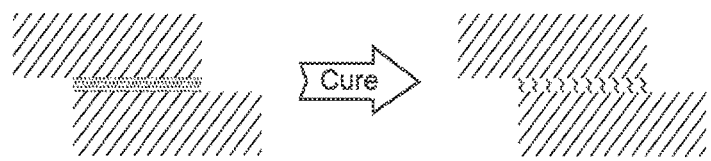
FIG. 1A shows a curing scheme using secondary bonding.
Figure 1B:
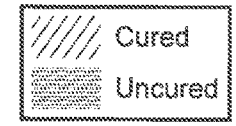
FIG. 1B shows a curing scheme using co-bonding.
Figure 1B:
Figure 1C:
FIG. 1C shows a curing scheme using co-curing.
Figure 2A:
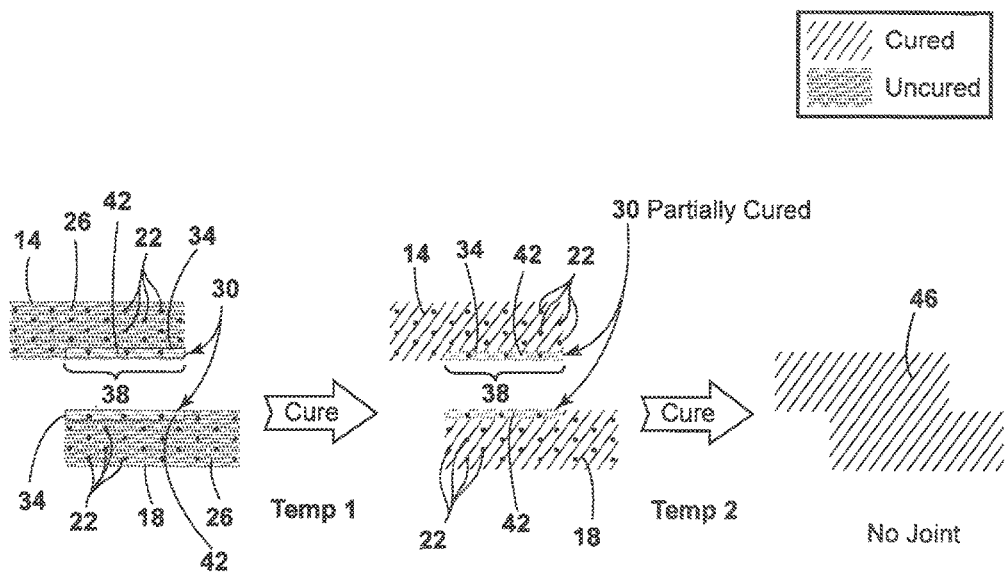
FIG. 2A shows a co-curing scheme using uncured plies.

With reference to FIG. 2A, a first composite substrate 14 and a second composite substrate 18 are uncured or partially cured and may have one or more reinforcement fibers 22 placed in a first curable resin 26 of the first and second composite substrates 14, 18. A co-cure prepreg tape 30 may be coupled to a faying surface 34 on one or both of the first and second composite substrates 14, 18 to form a prepreg tape portion 38. The co-cure prepreg tape 30 is made from a second curable resin 42 having one or more chemically protected functional groups as part of the resin composition. After the co-cure prepreg tape 30 is coupled to the faying surface 34 of one or both of the first and second composite substrates 14, 18, a first temperature is applied to fully cure the first and second composite substrates 14, 18 and partially cure the co-cure prepreg tape 30. A second temperature is then applied to both: deprotect the chemically protected functional groups of the second curable resin 42 to yield polymerizable functional groups in the second curable resin 42; and simultaneously cure the prepreg tape portions 38 of the first and second composite substrates 14, 18 to form a single covalently bonded composite structure 46.

Figure 2B:
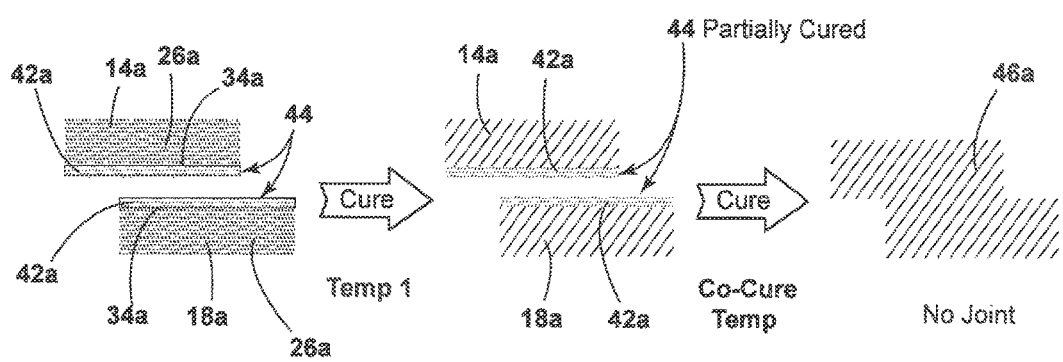
FIG. 2B shows a co-curing scheme using uncured layers.

Referring now to FIG. 2B, a first composite substrate 14a and a second composite substrate 18b are uncured or partially cured and may have one or more reinforcement fibers 22 (not shown) placed in a first curable resin 26a of the first and second composite substrates 14a, 18a. A co-cure prepreg layer 44 may be coupled to a surface 34a on one or both of the first and second composite substrates 14a, 18a to form the co-cure prepreg layer 44. The co-cure prepreg layer 44 is made from a second curable resin 42a having one or more chemically protected functional groups as part of the resin composition. After the co-cure prepreg layer 44 is coupled to the surface 34a of one or both of the first and second composite substrates 14a, 18a, a first temperature is applied to fully cure the first and second composite substrates 14a, 18a and partially cure the co-cure prepreg layer 44. A second temperature is then applied to both: deprotect the chemically protected functional groups of the second curable resin 42a to yield polymerizable functional groups in the second curable resin 42a; and simultaneously cure the prepreg layer 44 of the first and second composite substrates 14a, 18a to form a single covalently bonded composite structure 46a.

The disclosure herein enables the fabrication of co-cured structures without the need for a complex mold, autoclave or oven large enough to contain the full-scale composite structures such as the components of a commercial aircraft. Instead, sub-components can be prepared in smaller, simpler molds and autoclaves where the co-cure prepreg tape 30 and/or co-cure prepreg layer 44 may be applied to the faying surfaces 34, 34a. A continuous, joint-free, assembled composite structure can be prepared using a subsequent curing process in a heated device to produce co-cured structures designed to meet Federal Aviation Administration (FAA) certification criteria for composite structures because no adhesive bond or mechanical fasteners are needed. This disclosed co-cure method offers a variety of advantages new to the field of adhesive bonding: 1) preparing a functional group protected resin with complete or nearly quantitative protection to prevent curing at the first temperature; 2) applying two or more composite substrates to each other at a reflow temperature to form a substructure with no breaks or discontinuities; 3) quantitatively removing the protection groups from the functional groups of the resin without damaging the resin or fabricated part; and 4) curing the joint of two or more composite substrates outside of an autoclave.

The present invention is a method for bonding composite substrates including: providing a first composite substrate 14 and a second composite substrate 18 wherein both the first composite substrate 14 and the second composite substrate 18 are uncured or partially cured and include one or more reinforcement fibers 22 and a first curable resin 26; coupling a co-cure prepreg tape 30 onto a faying surface 34 of both the first and second composite substrates 14, 18 wherein the co-cure prepreg tape 30 has a second curable resin 42 having one or more chemically protected polymerizable functional groups; curing the first and second composite substrates 14, 18 to the co-cure prepreg tape 30 at a first temperature to form a co-cure prepreg tape portion 38 wherein the first and second composite substrates 14, 18 are fully cured and the co-cure prepreg tape 30 is partially cured; coupling the co-cure prepreg tape portion 38 of the first composite substrate 14 to the co-cure prepreg tape portion 38 of the second composite substrate 18; applying a second temperature to facilitate deprotection with water and a hydrolysis catalyst of the chemically protected polymerizable functional groups to give unprotected polymerizable functional groups and cure the co-cure prepreg tape portion 38 of the first composite substrate 14 to the co-cure prepreg tape portion 38 of the second composite substrate 18 to form a single covalently bonded composite structure 46.

The terms "cure" and "curing" as used herein encompass polymerizing and/or crosslinking of a resin or polymeric material brought about by mixing of reactive based components with a functionality of two or more, heating at elevated temperatures, and/or exposing the materials to ultraviolet light and radiation. The term "fully cured," as used herein, ideally refers to a 100% degree of cure. As known in the art, even when using the term "fully cured" there may still regularly be some residual functional groups that have not polymerized or cross-linked due to chain end mobility or other known reasons. In some embodiments, a "fully cured" resin or composition may contain less than about 1%, about 0.1%, or about 0.01% residual reactive functional groups as determined by the molar percentage of the initial total moles of functional groups in a material. "Partially cured" as used herein refers to less than about 100% degree of cure. In some embodiments, a "partially cured" resin may contain more than about 10%, about 20%, about 30%, about 50%, about 60%, about 70%, about 80%, or about 90% residual reactive functional groups as determined by the molar percentage of the initial total moles of functional groups in the material.

The number and types of composite substrates used in the disclosed co-cure process to make the final composite structures can vary depending on the application and intended use of the final composite material. For example, in some embodiments, two composite substrates may be co-cured together but in other embodiments three or more different composite substrates may be used to fabricate or co-cure the final composite structure. The composite substrates used in the co-cure process are all initially uncured or partially cured so that these materials have the capability to be cured, co-cured, and covalently bonded to other composites or co-cure prepreg materials such as the co-cure prepreg tape 30 or co-cure prepreg layer 44.

Examples of suitable thermoset resins that may be used for the first curable resin 26 and the second curable resin 42 that make up the first and the second composite substrates 14, 18, respectively, and the co-cure prepreg tape and layer 30, 44 include, but are not limited to, epoxies, phenolics, cyanate esters, polyimides, bismaleimides, polyesters, polyurethane, benzoxazines (including polybenzoxazines), amines, alcohols, and combinations thereof.

In some embodiments, a multifunctional epoxy resin (or polyepoxide) having a plurality of epoxide functional groups per molecule may be used for the first curable resin 26 and the second curable resin 42. The polyepoxide may be saturated, unsaturated, cyclic, or acyclic, aliphatic, aromatic, or hetero-cyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)-methane), fluorine 4,4'-dihydroxy benzophenone, bisphenol Z (4,4'-cyclohexy-lidene-bisphenol) and 1,5-hyroxynaphthalene.

Examples of suitable epoxy resins used for the first and second curable resins 26, 42 include diglycidyl ethers of bisphenol A or bisphenol F, e.g. EPONTM 828 (liquid epoxy resin), DER 331, DER 661 (solid epoxy resins) available from Dow Chemical Co.; triglycidyl ethers of aminophenol, e.g. AR ALDITE® MY 0510, MY 0500, MY 0600, MY 0610 from Huntsman Corp. Additional examples include phenol-based novolac epoxy resins, commercially available as DEN 428, DEN 431, DEN 438, DEN 439, and DEN 485 from Dow Chemical Co.; cresol-based novolac epoxy resins commercially available as ECN 1235, ECN 1273, and ECN 1299 from Ciba-Geigy Corp.; hydrocarbon novolac epoxy resins commercially available as TACTIX® 71756, TACTIX®556, and TACTIX®756 from Huntsman Corp. In some embodiments, the epoxy resin may be DER 331 which is the reaction product of epichlorohydrin and bisphenol A. The tradename DER 331 is also commonly known as bisphenol A diglycidyl ether or 2,2'-(((propane-2,2-diylbis (4,1-phenylene))bis(oxy))bis(methylene))bis(oxirane).

The first and second composite substrates 14, 18 may contain one or more reinforcement fibers or a layer of fibrous material. These fiber reinforced composites, including prepregs or prepreg layups, are ideal materials to be used for making aerospace composite structures. The term "prepreg," as defined herein, refers to a layer of fibrous material (e.g. fibers, unidirectional fibers, unidirectional tows or tape, non-woven mat, and/or fabric ply) that has been impregnated with a curable matrix resin or curable resin as previously described above. The first curable resin 26 in the composite substrates may be in an uncured or partially cured state. Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements. The fiber reinforcement material may be in the form of a woven or nonwoven fabric ply, or continuous unidirectional fibers. The term "unidirectional fibers", as used herein, refers to a layer of reinforcement fibers that are aligned in the same direction.

The reinforcement fibers in the composite substrates (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments.

In some embodiments, the one or more reinforcement fibers may include, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof.

The co-cure prepreg tape 30 contains the second curable resin 42 that may be a mixture of the multifunctional epoxy resin (previously described above) having a protected functional group that can react with the epoxy group once deprotected. Besides the portion of unprotected functional groups in the first and second composite substrates 14, 18 that may intermix or diffuse into the co-cure prepreg tape 30 during a reflow step described below that can be used to co-cure or cure the first and second composite substrates 14, 18 to the co-cure prepreg tape 30, respectively, the majority of functional groups that could react with the multifunctional epoxy resin are protected in the co-cure prepreg tape 30. The protected polymerizable functional groups leave the co-cure prepreg tape 30 uncured and ready for assembly and additional co-cure steps in an out-of-autoclave process.

The assembly process requires water to reverse the inhibiting or protection effects of the imines in the co-cure tape 30 before joining the co-cure prepreg portions 38 together. Crosslinking results in a solid part with seamless, continuous structure through the joint, much like the co-curing result. But like the secondary bonding process, an autoclave is not necessary and more complex structures can be bonded. In some embodiments, as an alternative to using an autoclave for heating the substructures or first and second composite substrates 14, 18, other non-limiting options for heating can be a vacuum bag and oven, a mechanical clamping approach and an oven, a heat blanket, or other radiating heat sources.

When compared to secondary bonding and co-bonding, the co-cure method reduces the number of exposures to heat in an autoclave to complete the final composite structure. Also, because this method does not rely on an autoclave to join parts to make the entire structure, rather only pieces of it, the creation of large-scale composite structures is possible. The seamless joint between two parts of the composite structure eliminates the need for redundant mechanical fasteners.

The reactivity of the co-cure prepreg tape can be inhibited and activated in a controllable manner. Protection chemistry of the reactive functional groups can be used to prevent the polymerization and crosslinking within the resin. In some embodiments, crosslinking and polymerization occurs when an epoxy is combined with a hardener or co-monomer and the materials are heated and/or pressed causing the resin mixture to cure. The hardener component contains functional groups that readily react with the epoxy functionality of the epoxy resin to produce highly cross-linked networks resulting in a fully cured composite structure. One common functional group used as a hardener is primary amines. Primary amines are functional groups with a $H_2N$—. By using ketone or aldehyde protection chemistry, an amine's functionality can be blocked through the formation of imines. The reaction schemes below show the reversible protection of primary amines using aldehydes or ketones.

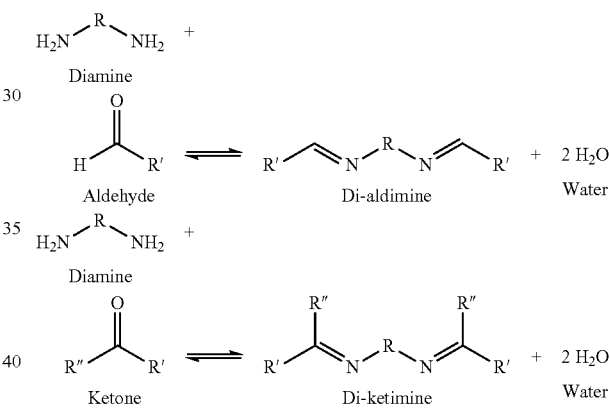

Aldimines are imines that are formed after a primary amine is reacted with an aldehyde. Ketimines are imines that formed after a primary amine has been reacted with a ketone. The amine functional group is protected by condensation with a ketone or aldehyde to form an imine. In both of these reaction schemes, the removal of water is directly proportional to the amount of imine that is produced. The imine is not reactive with epoxies when added as a hardener. Because this reaction is reversible, water can react with the imine to reproduce the amine and its associated aldehyde or ketone. A variety of effective catalysts may be used to facilitate the hydrolysis of the imine such as, for example, acidic alumina and imidazole.

Amines suitable for use as described herein include but are not limited to 4,6-diethyl-2-methylbenzene-1,3-diamine (ethacure 100), benzene-1,2-diamine (ortho-phenylenediamine), benzene-1,3-diamine (meta-phenylenediamine), benzene-1,4-diamine (para-phenylenediamine), benzidine, 2,5-diaminotoluene, and combinations thereof.

Ketones suitable for use as described herein include but are not limited to methyl isobutyl ketone (MIBK), acetone, methyl ethyl ketone, methyl n-propyl ketone, methyl isopropyl ketone, methyl n-butyl ketone, methyl amyl ketone, diethyl ketone, ethyl propyl ketone, ethyl butyl ketone, ethyl amyl ketone, dipropyl ketone, propyl butyl ketone, dibutyl ketone, butyl amyl ketone, allyl butyl ketone, diamyl ketone, 2,4-hexanedione, methyl vinyl ketone, isophorone, dihydroisophorone, cyclopentanone, cyclopentenone, cyclohexanone, cyclohexenone, acetophenone, ethyl phenyl ketone, benzophenone, and combinations thereof.

Aldehydes suitable for use as described herein include but are not limited to 4-methylbenzaldehyde (para-tolualdehyde), 3-methylbenzaldehyde (meta-tolualdehyde), 2-methylbenzaldehyde (ortho-tolualdehyde), benzaldehyde, isobutyraldehyde, and combinations thereof.

When the co-cure prepreg tape 30 is coupled to the first and second composite substrates 14, 18, both the co-cure prepreg tape 30 and the respective composite structure may be heated at a reflow temperature that may be lower than the first temperature. As the reflow temperature is applied to the co-cure prepreg tape 30 coupled to the first and second composite substrates 14, 18, the first and second curable resins 26, 42 may begin to reflow with the composite substrates. In these embodiments, the term "reflow," as used herein, means deprotected functional groups in the first curable resin 26 of the first and second composite substrates 14, 18, such as amine groups, may intermix and/or interdiffuse into the second curable resin 42 of the co-cure prepreg tape portion 38. In addition, as part of the reflow, the protected functional groups in the second curable resin 42 of the co-cure prepreg tape portion 38, such as imine groups, may intermix and/or interdiffuse into the first curable resin 26 of the first and second composite substrates 14, 18, respectively. The mixing, migration, and/or diffusion, of protected and unprotected functional groups within the first and second curable resins 26, 42 allows the first and second composite structures 14, 18 to be co-cured or covalently bonded to the co-cure prepreg tape portion 38 to form a single covalently bonded composite substrate. Although a portion of the deprotected functional groups intermix into the co-cure prepreg tape portion 38 with the functional protected groups and the protected functional groups intermix into the composite structures 14, 18 with the deprotected functional groups, a majority of both the protected and deprotected functional groups remain located in their respective co-cure prepreg tape portion 38 or composite substrate 14, 18 areas. The reflow temperature may be from about 25° C. to about 150° C., from about 25° C. to about 125° C., from about 25° C. to about 100° C., from about 50° C. to about 100° C., from about 50° C. to about 75° C., or from about 75° C. to about 100° C.

After the reflow temperature is applied to intermix the protected and unprotected functional groups of the first and second curable resins 26, 42, the first temperature may be applied to co-cure the co-cure prepreg tape 30 to the first and second composite substrates 14, 18 respectively, until the first and second composite substrates 14, 18 are fully cured and the co-cure prepreg tape 38 is partially cured due to the protected polymerizable functional groups remaining in the co-cure prepreg tape 38. The first temperature may be from about 50° C. to about 400° C., from about 50° C. to about 375° C., from about 50° C. to about 250° C., from about 75° C. to about 350° C., from about 75° C. to about 250° C., from about 100° C. to about 250° C., from about 125° C. to about 350° C., or be set at about 50° C., about 75° C., about 100° C., about 125° C., about 150° C., about 175° C., about 200° C., about 225° C., about 250° C., about 275° C., about 300° C., about 325° C., about 350° C., or about 375° C.

Once the first and second composite substrates 14, 18 are fully cured and the co-cure prepreg tape 30 is partially cured, the partially cured co-cure prepreg tape portion 38 of the first composite substrate 14 may be coupled to the partially cured co-cure prepreg tape portion 38 of the second composite substrate 18. Coupling the two partially cured co-cure prepreg tape portions 38 puts the deprotected functional groups of both composite substrates into direct physical contact with each other for both the deprotecting and final co-cure steps.

Applying the second temperature with water facilitates deprotection of the chemically protected polymerizable functional groups (e.g. imines) to give polymerizable functional groups (e.g. amines). In addition, applying the second temperature facilitates the co-curing of the co-cure prepreg tape portions 38 of the first composite material 14 and the co-cure prepreg tape portions 38 of the second composite material 18 to form a single covalently bonded composite structure 46. The second temperature may be the same or different from the first temperature and can range from about 50° C. to about 400° C., from about 50° C. to about 375° C., from about 50° C. to about 250° C., from about 75° C. to about 350° C., from about 75° C. to about 250° C., from about 100° C. to about 250° C., from about 125° C. to about 350° C., or be set at about 50° C., about 75° C., about 100° C., about 125° C., about 150° C., about 175° C., about 200° C., about 225° C., about 250° C., about 275° C., about 300° C., about 325° C., about 350° C., or about 375° C.

As described herein, in some embodiments the protected polymerizable functional group is the aldimine or ketamine. As the second temperature is applied and the aldimine or ketamine is deprotected to give the reactive amine, the introduction of water may be required so that the hydrolysis or deprotection reaction can take place. Water may be added to the partially cured co-cure prepreg tape portions 38 of the first and second composite substrates 14, 18 by coupling a layer of water to the faying surface of co-cure prepreg tape portions 38 when coupling the composite substrates into direct physical contact with each other before the deprotecting and final co-cure steps. In addition to the water being added to enable the hydrolysis of the aldimine or ketamine to the amine, a hydrolysis catalyst may be added to facilitate the hydrolysis. In some embodiments, hydrolysis catalysts suitable for use include but are not limited to acidic alumina, imidazole, and combinations thereof.

In other embodiments, the first and second curable thermoset resin 26, 42 of the first and second composite substrates 14, 18 and co-cure prepreg tape 30 may all contain one or more additives, accelerators, or catalysts that function to modify the rate of the polymerization and/or crosslinking reaction in the corresponding thermoset resins.

In some embodiments, curing agents (or curatives) are preferentially selected to allow for a slower cure rate than that of the composite substrate's matrix resin. The curatives may be selected from well-known curatives with reactivities that are well established. For instance, curatives for epoxy resins in order of increasing curing rate are generally classified as: polymercaptan<polyamide<aliphatic polyamine <aromatic polyamine derivatives<tertiary amine boron trifluoride complex<acid anhydride<imidazole<aromatic polyamine<cyanoguanadine<phenol novolac. This list is only a guide and overlap within classifications exists. Curatives of the surface treatment layer are generally selected from groups that are listed towards the higher end of the reaction order, whereas the composite substrate's curatives may be generally selected from groups towards the beginning of the reaction order.

Some non-limiting examples of curatives that may be used include, but are not limited to, melamine and substituted melamine derivatives, aliphatic and aromatic primary amines, aliphatic and aromatic tertiary amines, boron trifluoride complexes, guanidines, dicyandiamide, bisureas (including 2,4-toluene bis-(dimethyl urea), commercially available as CA 150 from CVC Thermoset Specialties), 4,4'-Methylene bis-(phenyl dimethylurea), e.g. CA 152 from CVC Thermo-set Specialties), 4,4'-diaminodiphenylsulfone (4,4-DDS), and combinations thereof.

Cure inhibitors are molecules able to slow the rate of reaction between the thermoset resins and curatives. Thus, the thermoset resins and curatives used in the composite substrate and co-cure prepreg tape will cure at a slower rate due to the presence of the inhibitors.

In some embodiments, examples of suitable cure inhibitors include, but are not limited to, boric acid, trifluoroborane, and derivatives thereof such as alkyl borate, alkyl borane, trimethoxyboroxine and organic acids having a pKa from 1 to 3 such as maleic acid, salicyclic acid, oxalic acid and mixtures thereof. Other inhibitors include metal oxides, metal hydroxides, and alkoxides of metal, where the metal is zinc, tin, titanium, cobalt, manganese, iron, silicon, boron, or aluminum. When such inhibitor is used, the amount of inhibitor may be up to about 15 parts per hundred parts of resin or PHR, for example, about 1 to about 5 PHR, in a resin composition. "PHR" is based on the total weight of all resins in the resin composition.

Catalysts facilitate the polymerization and crosslinking reactions of the thermoset resins when epoxy resins are used. Some examples of suitable catalysts for epoxy polymerization and crosslinking are compounds containing amine, phosphine, heterocyclic nitrogen, ammonium, phosphonium, arsenium, or sulfonium moieties. In other embodiments, heterocyclic nitrogen-containing and amine-containing compounds may be used such as, for example, imidazoles, imidazolidines, imidazolines, benzimidazoles, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, and combinations thereof. When such catalysts are used, the amount of catalyst(s) may be up to about 15 parts per hundred parts of resin or PHR, for example, about 1 to about 5 PHR, in a resin composition.

Inorganic fillers in particulate form (e.g. powder) may also be added to the curable thermoset resins of the first and second composite substrates 14, 18 as a rheology modifying component to control the flow of the resin composition and to prevent agglomeration therein. In some embodiments, suitable inorganic fillers may include, but are not limited to, fumed silica, talc, mica, calcium carbonate, alumina, ground or precipitated chalks, quartz powder, zinc oxide, calcium oxide, and titanium dioxide. If present, the amount of fillers in the resin composition may be from about 0.5% to about 40% by weight, or about 1% to about 10% by weight, or about 1% to about 5% by weight, based on the total weight of the resin composition.

In a second embodiment, shown in FIG. 2B, the present invention provides a method for bonding composite substrates including: providing a co-cure prepreg layer 44 cured to a surface 34a of both a first composite substrate 14a and a second composite substrate 18a wherein the co-cure prepreg layer 44 includes a chemically protected polymerizable functional group; coupling a portion of the co-cure prepreg layer 44 cured to the first composite substrate 14a to a portion of the co-cure prepreg layer 44 cured to the second composite substrate 18a; applying a deprotection initiator to deprotect the protected polymerizable functional group of the co-cure prepreg layers 44 and to couple the co-cure prepreg layers 44 of the first and second composite substrates 14a, 18a, to form a single covalently bonded composite structure 46a.

It is understood that the descriptions outlining and teaching the method for bonding composite structures previously discussed, which can be used in any combination, apply equally well to the second embodiment of the invention, where applicable, further disclosing a method for bonding composite substrates.

As an alternative to the co-cure prepreg tape 30 described above that only couples to a portion of the first and second composite substrates 14, 18, here, the co-cure prepreg layer 44 may be couples to the entire surface of the first and second composite substrates 14, 18. The co-cure prepreg layer 44 contains the second curable resin 42 that may be a mixture of the multifunctional epoxy resin (previously described above) having a protected functional group that can react with the epoxy group once deprotected. Besides the portion of unprotected functional groups in the first and second composite substrates 14, 18 that may intermix or diffuse into the co-cure prepreg tape 30 during the reflow step described above that can be used to co-cure or cure the first and second composite substrates 14, 18 to the co-cure prepreg layer 44, respectively. The majority of functional groups that could react with the multifunctional epoxy resin are protected in the co-cure prepreg layer 44 so these protected polymerizable functional groups leave the co-cure prepreg layer 44 uncured and ready for assembly and additional co-cure steps in an out-of-autoclave process.

The advantages of using the co-cure prepreg layer 44 instead of the co-cure prepreg tape 30 is having more of the second curable resin 42 in contact with the first curable resin 26 of the first and second composite substrates 14, 18 to give more of a co-cured surface area. Depending on the desired use and application of the final covalently bonded composite structure 46a, the use of the co-cure prepreg layer 44 may offer the required bonding and adhesion needed between the composite substrates. The final single covalently bonded composite structure 46a may comprises a crosslinked amine-cured epoxy polymer network when epoxides and amines are used as the polymerizable or crosslinkable functional groups in the first and second curable resins 26, 42.

Depending on the composition of the second curable resin containing the protected polymerizable functional groups, a variety of different deprotection initiators may be used. As described above, water and a hydrolysis catalyst may be used for a chemical deprotection initiator. In other embodiments, thermal energy or light may be used to as the deprotection initiators for the protected polymerizable functional groups in the second curable resin in the co-cure prepreg tape 30 or co-cure prepreg layer 44. In some embodiments, the application of a mechanical force may be used as the deprotection initiator for the protected polymerizable functional groups in the second curable resin. In still other embodiments, the deprotection initiator comprises a heat source, a chemical reagent, a light source, a mechanical force, or a combination thereof.

In a third embodiment, the invention is a co-curable composite structure including: an uncured or partially cured composite substrate having one or more reinforcement fibers 22 and a first curable resin 26 wherein the first curable resin material 26 includes a first epoxide and an amine; a co-cure prepreg layer 44 on a surface 34 of the uncured or partially cured composite substrate wherein the co-cure prepreg layer 44 includes a second curable resin 42 having a second epoxide and a protected amine; wherein the uncured or partially cured composite substrate and the co-cure prepreg layer 44 are cured together at a first temperature until the uncured or partially cured composite structures and the co-cure prepreg layer 44 are functionally fully cured to form the co-curable composite structure; and wherein the protected amine of the co-cure prepreg layer remains latent until a deprotection and co-cure step.

It is understood that the descriptions outlining and teaching the method for bonding composite structures previously discussed, which can be used in any combination, apply equally well to the third embodiment of the invention, where applicable, further disclosing a co-curing composite structure.

The uncured or partially cured composite substrate and the co-cure prepreg layer 44 are cured together at the first temperature until the uncured or partially cured composite structures and the co-cure prepreg layer 44 are functionally fully cured. During this first temperature, the first epoxide and the amine from the first curable resin material 26 of the uncured or partially cured composite substrate are intermixed or interdiffused with the second epoxide and the protected amine from the second curable resin 42 of the co-cure prepreg layer 44 and vice versa. The intermixing of epoxides and amines, both protected and deprotected, are what facilitate the uncured or partially cured composite substrate and the co-cure prepreg layer 44 to be cured together. In some embodiments, the interdiffusion or intermixing of epoxides and amines, both protected and deprotected, may be performed at a separate reflow temperature before the first temperature is applied. After this initial curing of the uncured or partially cured composite substrate and the co-cure prepreg layer 44, the protected polymerizable functional group or protected amine remain latent in the co-cure prepreg layer 44 until the deprotection initiator may be applied to deprotect the protected amine to form the amine. The amine or other unprotected polymerizable functional group can then react with unreacted first and second epoxides to co-cure the co-curing composite structure to another such structure. Controlling or balancing the stoichiometry of the epoxide functional groups to the amines and protected amines allows for a controlled polymerization or cross linking reactions.

A suppression in the glass transition temperature is observed for the cured prepreg tape portion 38 or co-cure prepreg layer 44 having chemically protected functional groups such as imines with respect to the cure substrates or composites not having chemically protected functional groups. A decrease in the glass transition temperature ($T_g$) of at least about 25° C., about 50° C., about 75° C., about 100° C., about 125° C., about 150° C., or about 175° C. may be obtained for the cured substrates or composites (e.g. the cured prepreg tape portion 38 or the co-cure prepreg layer 44) with chemically protected functional groups relative to the glass transition temperature of the same cured substrates or composites using unprotected functional groups.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood that any described processes or steps within described processes may be combined with other disclosed processes or steps to form structures within the scope of the present device. The exemplary structures and processes disclosed herein are for illustrative purposes and are not to be construed as limiting.

EXPERIMENTAL

The following materials were used as received: Etha-cure 100 from the Albermarle Corporation, p-toluene sulfonic acid monohydrate, methylisobutylketone (MIBK), aniline, imidazole, diethyl ether, hexanes, and deuterated chloroform (CDCl3) and dimethysulfoxide (d6-DMSO) from Sigma Aldrich, p-tolualdehyde from Kodak, toluene from Acros Organics, and acidic alumina from Fisher Scientific. DER 331 epoxy resin from Dow Chemical Co. was dried under vacuum at 50° C. for at least 72 h before use. The m-phenylenediamine obtained from Sigma Aldrich was purified by vacuum distillation.

Imines can be prepared in a number of ways. If primary amines are readily reactive with aldehydes or ketones, there is no need for a catalyst or solvents to form the imine. In the case where aldehydes are used to protect a primary amine, the reaction is so spontaneous that it can progress to completion within minutes. Imines can be prepared from ketones with amines using an acid catalyst in refluxing toluene during an azeotropic distillation. Although solvents and catalysts are not required, this method is ideal when trying to ensure a homogeneous reaction mixture. Imines prepared neat with mild heating and vacuum may quickly solidify, which prevents further mixing. This method is only ideal if a solvent is introduced for a subsequent purification of imine process because it will ensure that the reagents will mix and react completely during the work up.

A number of imines were synthesized and used to advance the understanding of imine chemistry as it relates to this project. Initially ethacure 100 was selected as the ideal amine because it is difunctional (two amine groups), commercially available, and widely used for epoxy hardening. It is difficult to isolate pure products and interpret spectral data when using ethacure 100 because it reacts to yield an 80/20 mixture of stereoisomers.

To better identify changes in properties between amines and imines, aniline was used as a model because it is a simple, aromatic, primary amine. Derivatives of aniline were used to determine kinetic parameters of the protection/deprotection reaction. Because aniline is not a difunctional amine, it could not be used as an epoxy hardener to form crosslinked polymers. M-phenylenediamine was used as a comparison to ethacure 100 for the preparation of polymers. The aldehydes or ketones used to protect the molecule were either methyl isobutyl ketone (MIBK) or p-tolualdehyde. In some cases only aldimines formed, but both ketimines and aldimines were attempted for each amine. All of the amines and imines were characterized through $^1$H NMR, $^{13}$C NMR, GC-MS and FT-IR spectroscopy.

Ketimines were prepared using the generalized scheme as follows. Ethacure 100 (10 g) is placed in a 300 mL three neck round-bottom flask fitted with a magnetic stirrer, reflux condenser, nitrogen inlet, oil bubbler, and moisture trap. A ketone (e.g. MIBK) was added in excess (2.5 mol equivalents based on amine groups) and enough toluene was added to achieve ~20% solids based on the theoretical yield. P-toluene sulfonic acid monohydrate (0.05 mol %) was added and the reaction was heated to reflux overnight. Progress was monitored by observing the volume of water collected in the moisture trap. The anhydrous workup involved removal of solvent by atmospheric distillation followed by vacuum distillation (130° C., 0.7 mmHg) of the product that was recovered as a light yellow oil in moderate yield.

Aldimines were prepared using the generalized scheme as follows. Five grams of amine and a stoichiometric amount (based on amine groups) of aldehyde were mixed in a 100 mL three neck round-bottom flask equipped with a nitrogen inlet, oil bubbler, and magnetic stirrer. The neat reaction mixture quickly crystallized and then formed water droplets on the flask walls at room temperature over 2 to 5 hours. Water was removed by heating to 80° C. at reduced pressure (100 mmHg). The products were purified by recrystallization from ether or hexane.

Reaction products were characterized with a Bruker (Avance 300) Multinuclear Spectrometer operating at 300.152 MHz and a Thermo Scientific attenuated total reflectance Fourier transform infrared spectrometer (ATR-FTIR). Thermal analysis was performed on a SETARAIVI DSC131 differential scanning calorimeter (DSC) and a TA Instruments Ares rheometer. The DSC was programmed to heat at 20° C./min to 120° C. followed by cooling at 50° C./min to 0° C. and a second heating cycle at 20° C./min to 120° C. The $T_g$ was measured during the second heating step. The rheometer was programmed to follow the standard heating cycle recommended by Dow Chemical Co. to heat the DER 331 epoxy resin to 100° C. for 2 h followed by 175° C. for 4 h under flowing nitrogen gas.

Example 1—Synthesis of Model Aldimine

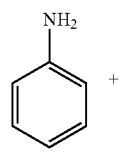

+

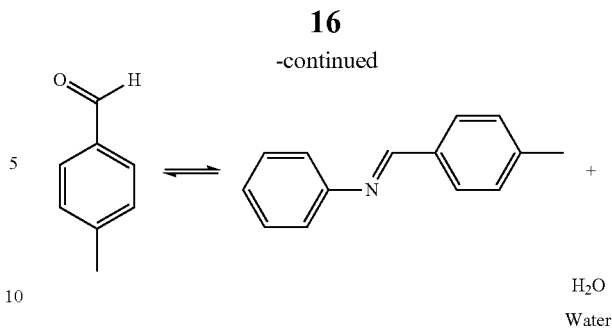

+

H$_2$O
Water

The amine group of aniline was protected by adding p-tolualdehyde to a three neck round-bottom flask fitted with a nitrogen inlet, and bubbler. Additionally, a stir bar, stirring hot plate, and silicone oil bath were used during the reaction. Equimolar stoichiometric amounts of aniline and p-tolualdehyde were added to the flask while vigorously stirring the solution. The flask was purged with a stream of nitrogen gas for 10 minutes and heated to 80° C. The mixture solidified quickly and temperature was constant for 30 minutes. The flask was then placed under vacuum using a water aspirator to remove residual water remaining in the solution. Hexanes were then added to the flask and the flask was heated until the solid was completely dissolved. The product was recrystallized from hexanes and was filtered using a Buchner funnel. The product was then placed in a vacuum oven and heated to remove any residual solvent. The resulting pure product was (E)-N-(4-methylbenzylidene) aniline (aniline aldimine). The product was a light yellow in color with a 28% yield.

$^1$H NMR (CDCl$_3$, 300 MHz): δ 2.45 (s, 3H), 7.42-7.18 (m, 7H), 7.84 (d, 2H, J=7.92 Hz), 8.46 (s, 1H). $^{13}$C NMR (CDCl$_3$, 75 MHz): δ 21.88, 121.13, 126.02, 129.12, 129.38, 129.78, 160.62. FT-IR 3029 cm$^{-1}$ (C—H), 1579 cm$^{-1}$ (C=N); mp: 44.6° C.

Example 2—Synthesis of Ketimine

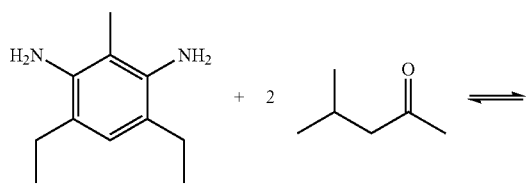

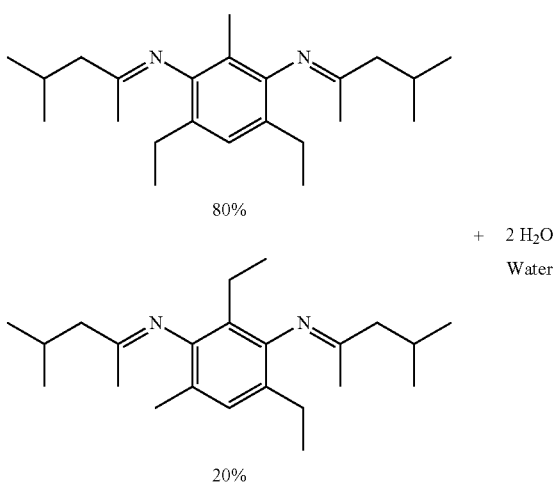

80%

+ 2 H$_2$O
Water

20%

A three neck round-bottom flask was fitted with a nitrogen inlet, reflux condenser and Dean-Stark distillation trap. The system was purged with nitrogen through a rubber septum fitted in the reflux condenser with an 18 ga. needle connected to an oil trap. A stir bar, stirring hot plate, and silicone oil bath were also used during the reaction. The flask was charged with toluene as a solvent, stoichiometric amounts of ethacure 100 and MIBK, and 0.01 mol of p-toluenesulfonic acid monohydrate as a catalyst. The flask was purged with a stream of nitrogen gas for 10 minutes with vigorous stirring. The reaction was heated to reflux while utilizing glass wool and aluminum foil as insulation. The mixture was held at reflux until the water collected in the Dean-Stark trap reached the theoretical yield or ceased to accumulate additional water. The contents of the Dean-Stark trap were drained and residual toluene was distilled from the reaction mixture. The remaining residue was vacuum distilled using a Vigreux column (pressure 0.57 torr, vapor temp. 145-147° C.). The resulting product was (N1E,N3E)-2,4-diethyl-6-methyl-N1,N3-bis(4-methylpentan-2-ylidene)benzene-1,3-diamine compound with (N1E,N3E)-4,6-diethyl-2-methyl-N1,N3-bis(4-methylpentan-2-ylidene)benzene-1,3-diamine (80:20) (ethacure 100 ketimine). The final pure product was clear yellow in color, with an 89% yield. This product darkens as it is exposed to air and light.

$^1$H NMR (CDCl$_3$, 300 MHz): δ 0.80 (t, 6H, J=9 Hz), 0.94 (d, 6H, J=4.5 Hz), 1.01 (t, 4H, J=8.7 Hz), 1.14 (m, 2H), 1.59-1.46 (m, 6H), 1.87-1.73 (s, 3H, J=18 Hz), 2.41-1.87 (m, 10H), 6.76-6.62 (d, 1H). $^{13}$C NMR (CDCl$_3$, 75 MHz): δ 21.88, 121.13, 126.02, 129.12, 129.38, 129.78, 139.78, 140.22, 160.62. FT-IR 2959 cm$^{-1}$ (C—H), 1636 cm$^{-1}$ (C=N).

Example 3—Synthesis of Aldimine

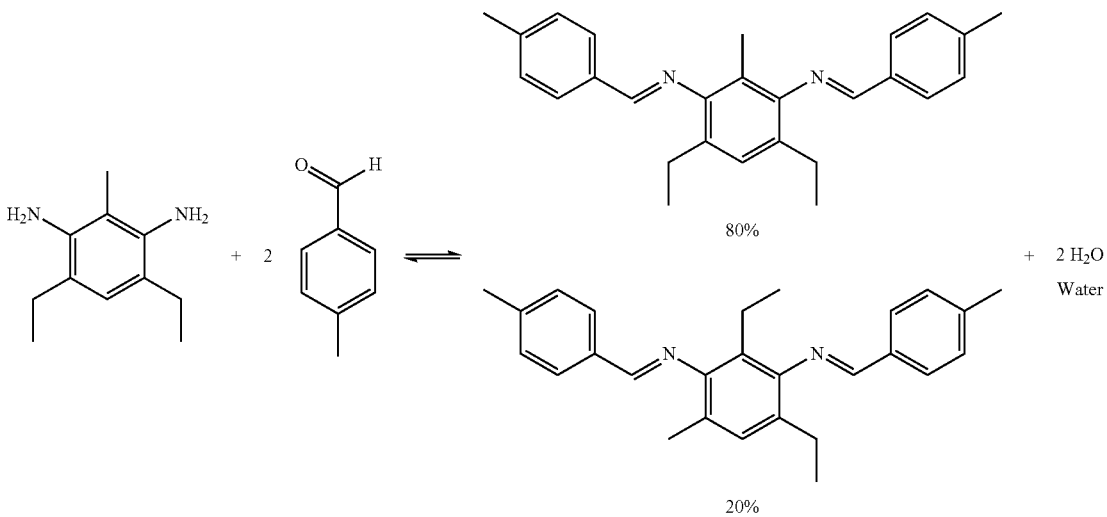

The synthetic method used for the ethacure 100 aldimine was similar to that of ethacure 100 ketimine with some modifications. No p-toluene sulfonic acid catalyst was used in the reaction. Crystal growth occurred very slowly (>12 h). The resulting products were (N1E,N3E)-2,4-diethyl-6-methyl-N1,N3-bis(4-methylbenzylidene)benzene-1,3-diamine compound and (N1E,N3E)-4,6-diethyl-2-methyl-N1,N3-bis(4-methylbenzylidene)benzene-1,3-diamine (80:20) (ethacure 100 aldimine). The product appeared to be amber in color with better than 80% yields.

$^1$H NMR (CDCl$_3$, 300 MHz): δ 0.93, 1.14 (t, 6H), 2.12, 1.92 (s, 3H), 2.43 (m, 10H), 6.59 (s, 1H), 7.30 (d, 4H), 7.81 (d, 4H), 8.21 (m, 2H)$^{13}$C NMR (CDCl$_3$, 75 MHz): δ 13.92, 14.38, 15.08, 18.39, 20.37, 21.80, 24.61, 24.80, 63.24, 122.07, 123.96, 126.29, 128.27, 128.72, 129.68, 129.93, 133.82, 142.00, 149.48, 162.18, 162.49, 165.65. FT-IR 2964 cm$^{-1}$ (C—H), 1640 cm$^{-1}$ (C=N); mp 121.7° C.

Example 4—Synthesis of Aldimine

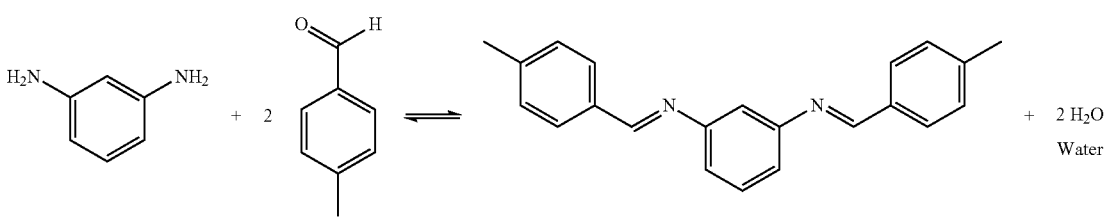

This imine was synthesized in a round bottom flask using a stir bar, stirring hot plate, and silicone oil bath was used during the reaction. The reagents were mixed neat with vigorous stirring. Within 10 minutes, the entire mixture solidified. The mixture was then placed under vacuum using a water aspirator. The solid remains were then completely dissolved into ethyl ether with applied heat. The pure product was then recrystallized from ethyl ether and filtered using a Buchner funnel. The product was then placed in a vacuum oven and heated to remove any residual ethyl ether. The resulting product was (N1E,N3E)-N1,N3-bis(4-methylbenzylidene)benzene-1,3-diamine (m-phenylenediamine aldimine). The product appeared to be a green solid in low yield.

$^1$H NMR (CDCl$_3$, 300 MHz): δ 2.51 (s, 1H), 3.33 (s, 10H), 7.34, 7.12 (d, 6H), 7.85 (d, 2H) 8.65 (s, 1H). $^{13}$C NMR (CDCl$_3$, 75 MHz): δ 19.61, 21.24, 21.87, 22.13, 60.58, 63.49, 95.21, 113.19, 118.74, 129.13, 129.96, 130.09, 142.22, 153.44, 160.86, 182.22, 192.20. FT-IR 2917 cm$^{-1}$ (C—H), 1567 cm$^{-1}$ (C=N); mp: 108.3° C.

Example 5—Kinetic Testing for Deprotection of Imine

The activation of a model aldimine compound with water to form an amine was observed in solution phase. A series of NMR experiments were carried out in d$_6$-DMSO with an equimolar stoichiometric amounts of water added to a known concentration of aniline aldimine. Five series were done; two with acidic alumina or imidazole catalysts, and three with no catalysts at different temperatures of 21, 30, and 42° C. The integration value of the imine, water, and aldehyde protons, at chemical shifts of 8.54, 3.36, and 9.94 ppm, respectively, were monitored to measure the consumption of imine and production of aldehyde. The reaction was assumed to follow a second order reversible rate law. A linearized form of the rate law was adapted from Hassan et al.

$$-\frac{d[\text{Aldimine}]}{dt} = k\{[\text{H}_2\text{O}][\text{Aldimine}] - \frac{[\text{Aniline}][\text{Aldehyde}]}{K_{eq}}\}$$

The integration of above equation:

$$\ln\left[\frac{(1+MR+a_2-2a_1X)(1+MR-a_2)}{(1+MR-a_2-2a_1X)(1+MR+a_2)}\right] = ka_2[\text{Aldimine}]_0 t \quad \text{Equation 1}$$

Where:

$$MR = \text{Molar Ratio} = \frac{\frac{X^0_{Water}}{2} + X^0_{Aldehyde}}{(1 - X^0_{Aldehyde})}; X = X^t_{Aldehyde};$$

$$a_1 = \left(1-(K_{eq})^{-1}\right); a_2 = \sqrt{(1+MR)^2 - 4a_1 MR}$$

The molar ratio (MR) is dimensionless, and is in terms of initial water $X_{Water}^0$ and initial aldehyde $X_{Aldehyde}^0$ mole fractions. X is the fractional conversion of imine into aldehyde. To calculate the constant $a_1$, the only value needed is the equilibrium constant ($k_{eq}$) which can be determined from the mole fractions measured at equilibrium.

Figure 3:
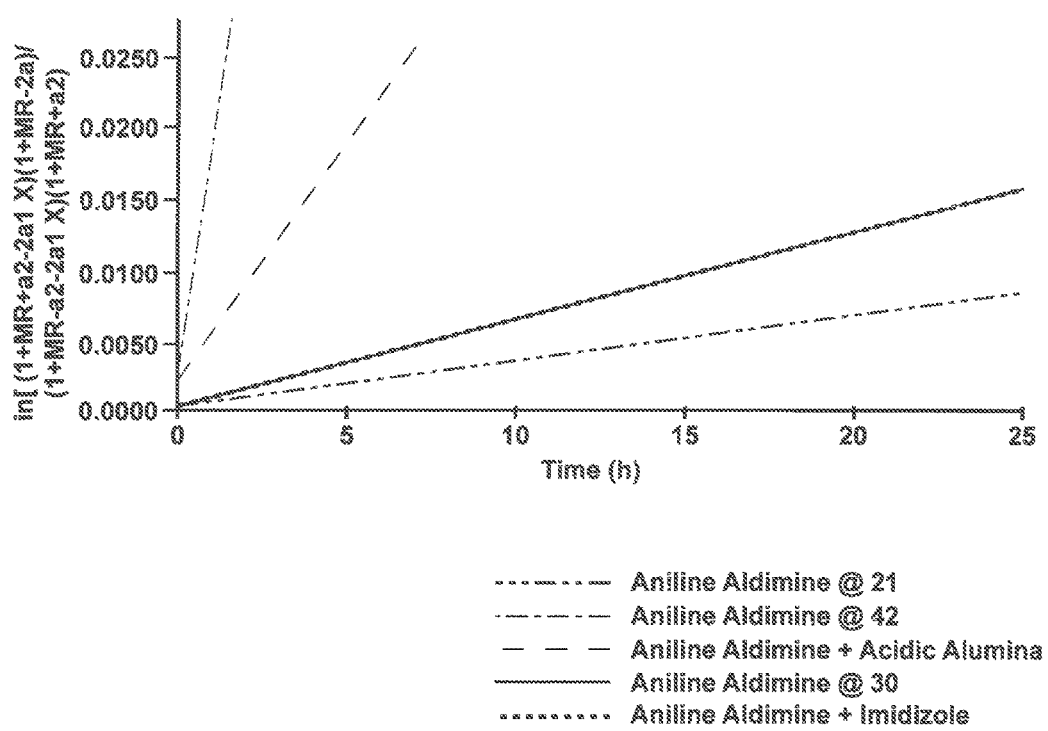
FIG. 3 is a graph showing the reversible second order kinetics for aldehyde formation of imine with water.

FIG. 3 was created using the best fitting data from the consumption of imine series. Equation 1 was used to plot this graph and determine the rate of imine consumption over time. Linear least-squares regression analysis resulted in an $R^2$>0.97 for the data in FIG. 3. The greatest increase in rate came from an increase in temperature for the reaction to 42° C. The addition of the acidic alumina as a catalyst was the second fastest increase to the rate for the reaction. The plotted data shows that an increase in temperature to 30° C. has almost the same effect on the reaction as the imidazole catalysts. The lowest rate, as expected, was the reaction at room temperature with no catalyst.

TABLE 1

Figure 5A:
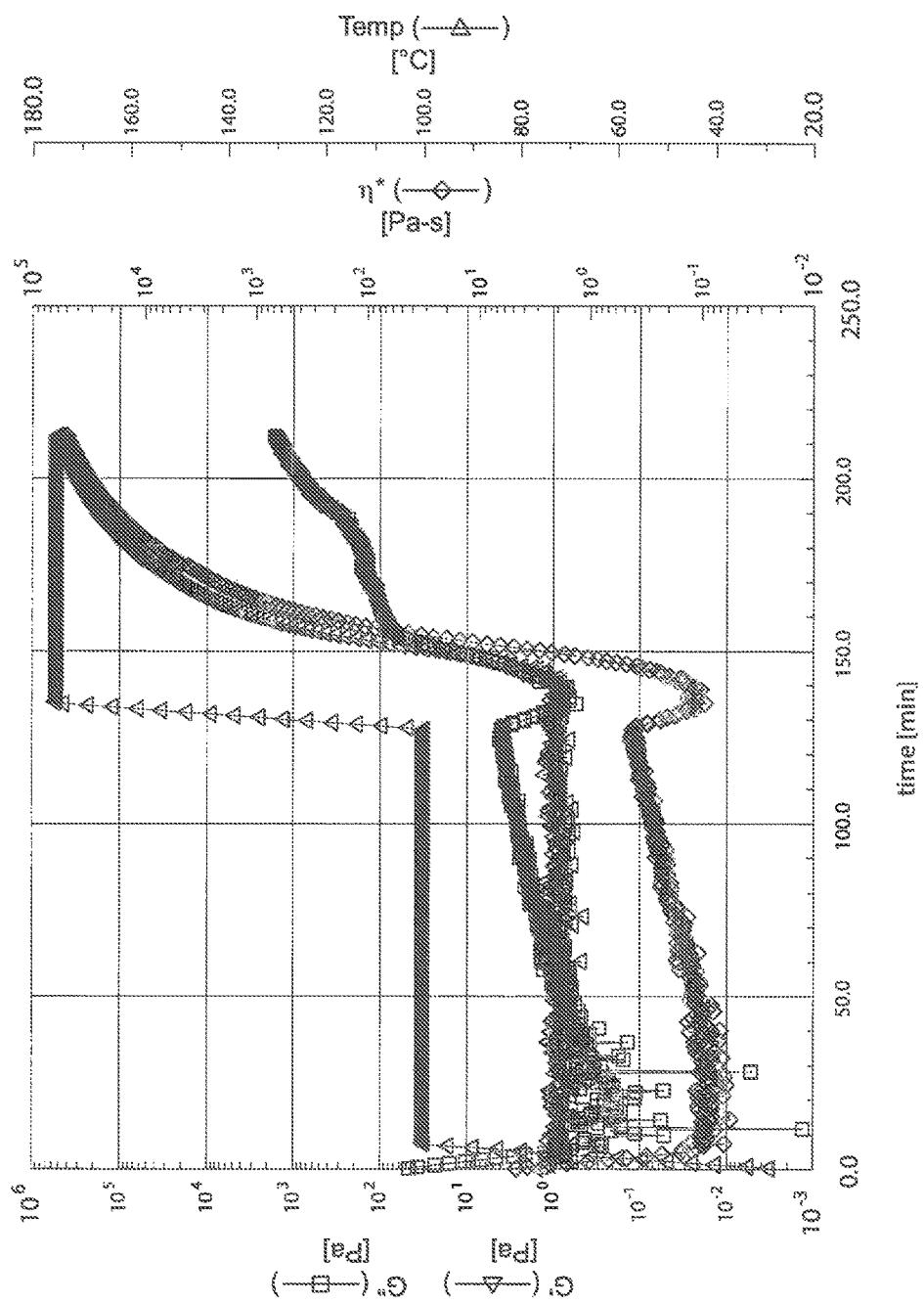
FIG. 5A is a graph showing rheometer results for Ethacure 100 Ketimine with imidazole catalyst mixed with dry DER 331.
Figure 5B:
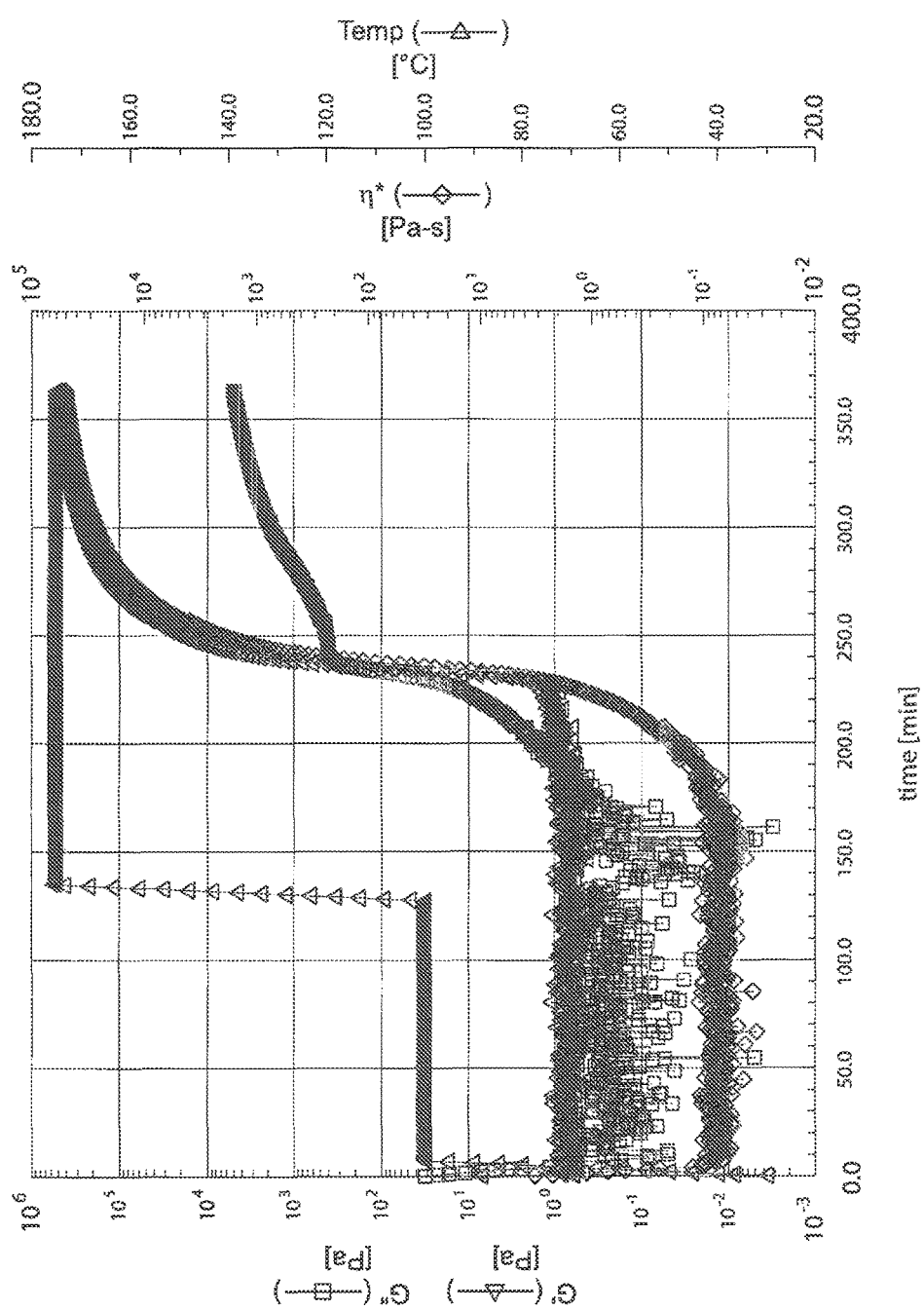
FIG. 5B is a graph showing rheometer results for Ethacure 100 Ketimine with acidic alumina catalyst mixed with dry DER 331.

Kinetic and equilibrium constants from time-resolved NMR experiments for the hydrolysis of aniline aldimine (see FIG. 5). $K_{eq}$ is the equilibrium constant, $k_f$ is the forward rate constant, and $X^E$ is the equilibrium fractional conversion of amine.

| Catalyst | $k_f$ (L/mol h) | $K_{eq}$ | $X^E$ |
|---|---|---|---|
| None | 0.87 | 52.2 | 0.86 |
| Acidic alumina | 2.63 | 57.7 | 0.84 |
| Imidazole | 1.96 | 55.1 | 0.85 |

Table 1 shows that both $K_{eq}$ and $X^E$ are independent of the catalyst type, but acid alumina accelerates the reaction by a factor of 3 and imidazole accelerates the reaction by 2.25.

TABLE 2

The kinetic and equilibrium constants from time-resolved NMR experiments for the hydration of aniline aldimine (see FIG. 3).

| Temperature ° C. | $k_f$ (L/mol h) | $K_{eq}$ | $X^E$ |
|---|---|---|---|
| 21.1 | 0.87 | 52.2 | 0.86 |
| 30.0 | 3.19 | 44.8 | 0.83 |
| 42.3 | 45.0 | 30.8 | 0.75 |

Much like the catalysts, temperature does not affect $K_{eq}$ or $X^E$ as shown in Table 2 but has a strong effect on the rate constants. Temperature accelerates the reaction when it is 30.0° C. by a factor of 3.6, and when it is 42.3° C. by a factor of 51.7.

Example 6—Rheology Study

A rheometer was used to see if protection chemistry inhibited crosslinking and polymerization in an epoxy resin. This experiment traced the viscosity of the resin, showing if it went from its initial state, a viscous liquid (q<1 kPa-s), to a glassy state (η>40 kPa-s). Advancement of an epoxy polymerization was monitored by a buildup in the viscosity at a constant temperature. Hardeners were mixed with DER 331 and a standard cure cycle was performed in the rheometer. The standard cure cycle recommended by the epoxy manufacturer was two hours at 100° C. followed by 175° C. for four hours. In some cases, vitrification of the resin caused the rheometer to overload and prematurely end the experiment. Nitrogen was used in the system because moisture in the air could cause deprotection and skew results. If the rheometer did not overload during the cure cycle, this indicated that the imine protecting chemistry inhibited polymerization more than cure cycles that reached overload. This indicated that the resin could be prevented from fully curing under common manufacturing conditions.

Figure 4A:
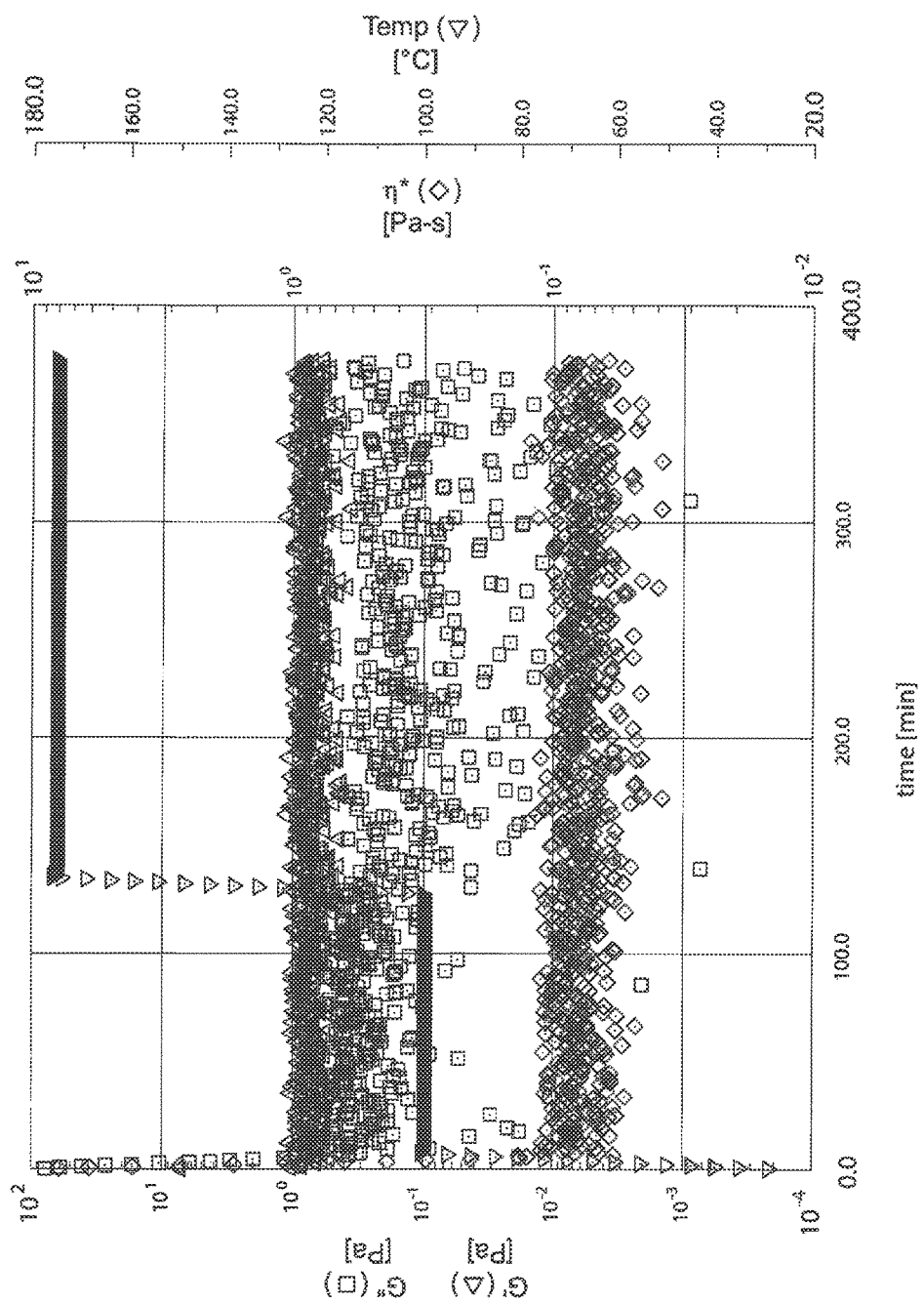
FIG. 4A is a graph showing rheometer results for dry DER 331 without hardener.
Figure 4B:
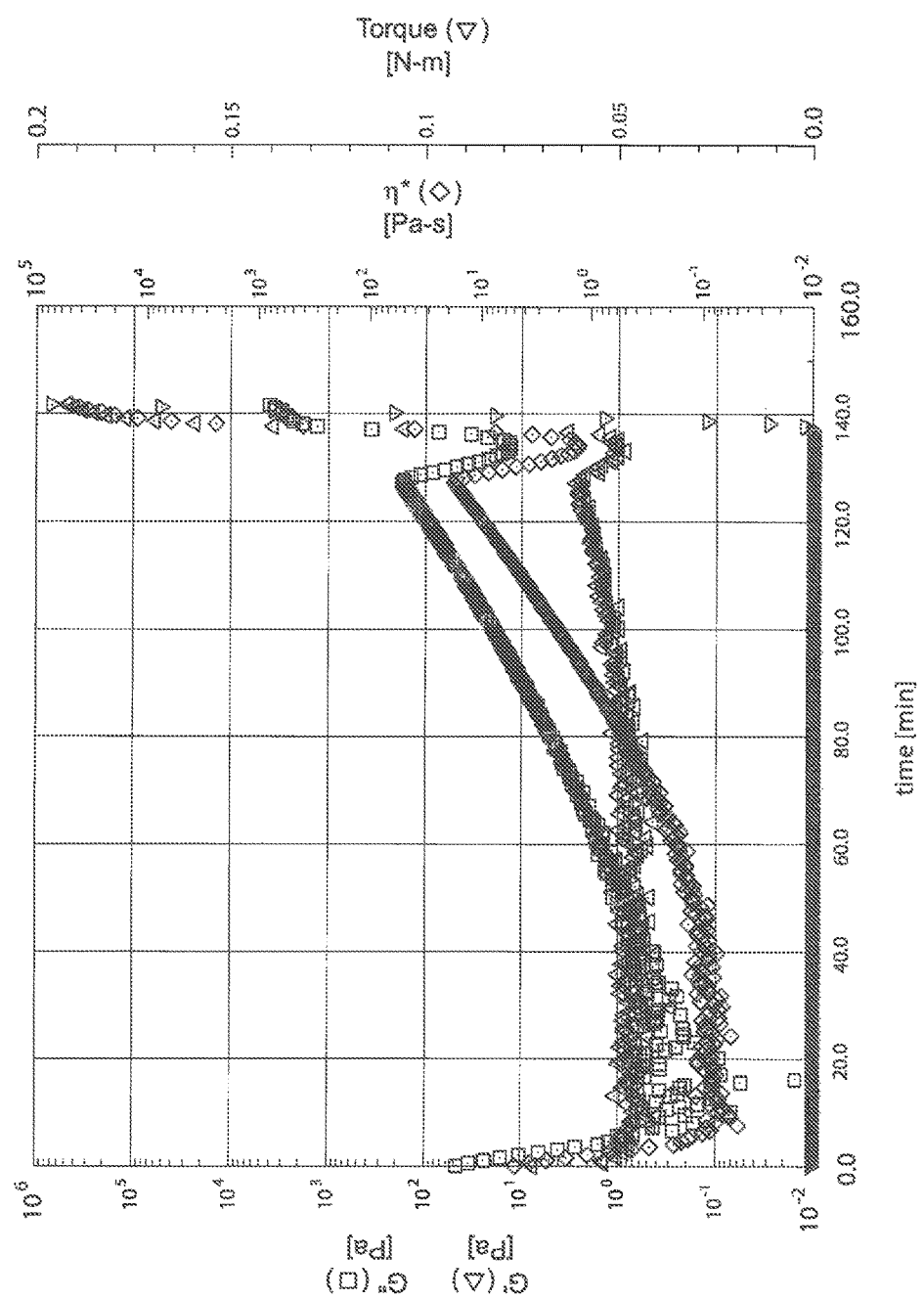
FIG. 4B is a graph showing rheometer results for dry DER 331 mixed with unprotected ethacure 100.
Figure 4C:
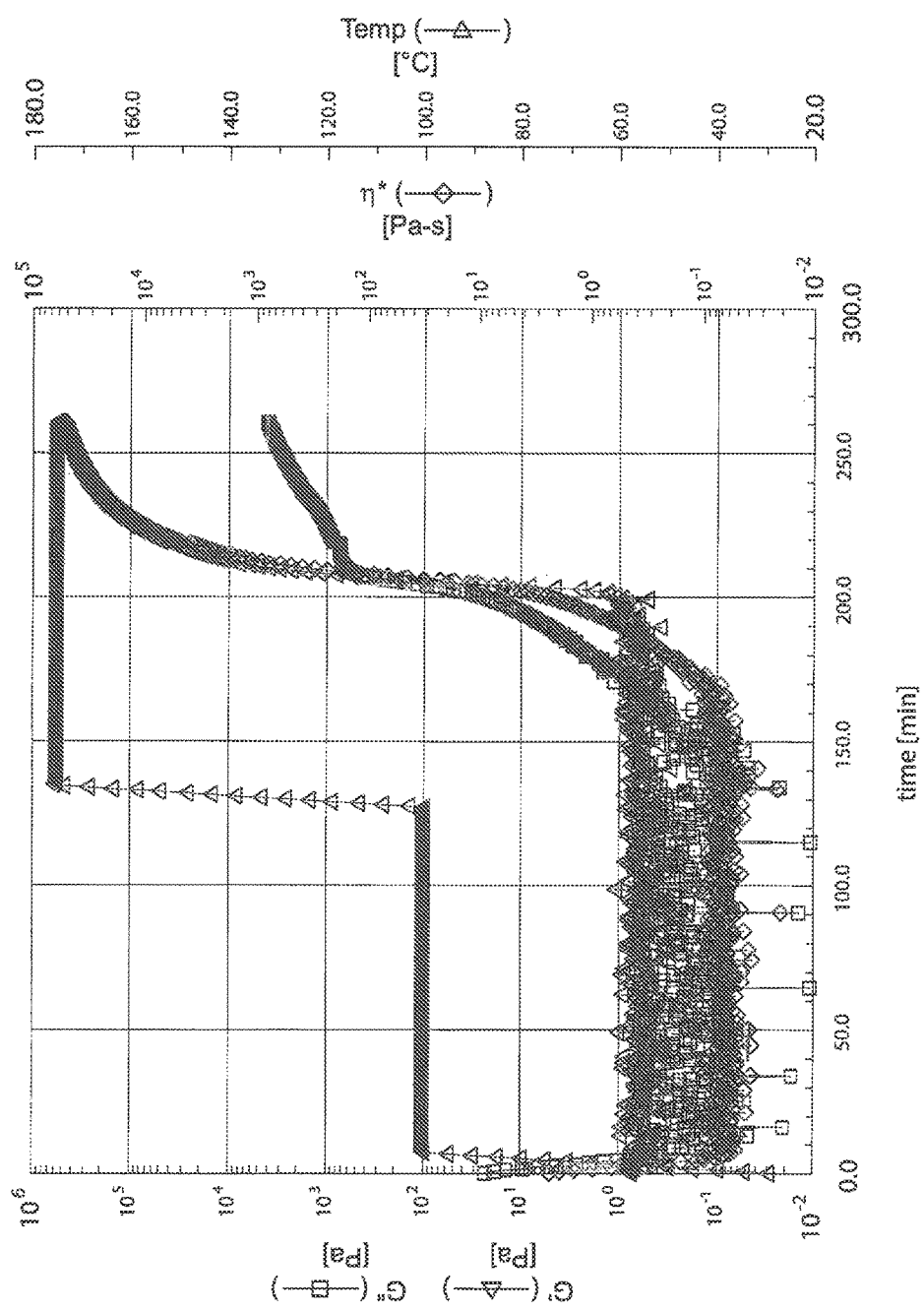
FIG. 4C is a graph showing rheometer results for dry DER 331 mixed with ethacure 100 ketimine protected from MIBK.
Figure 4D:
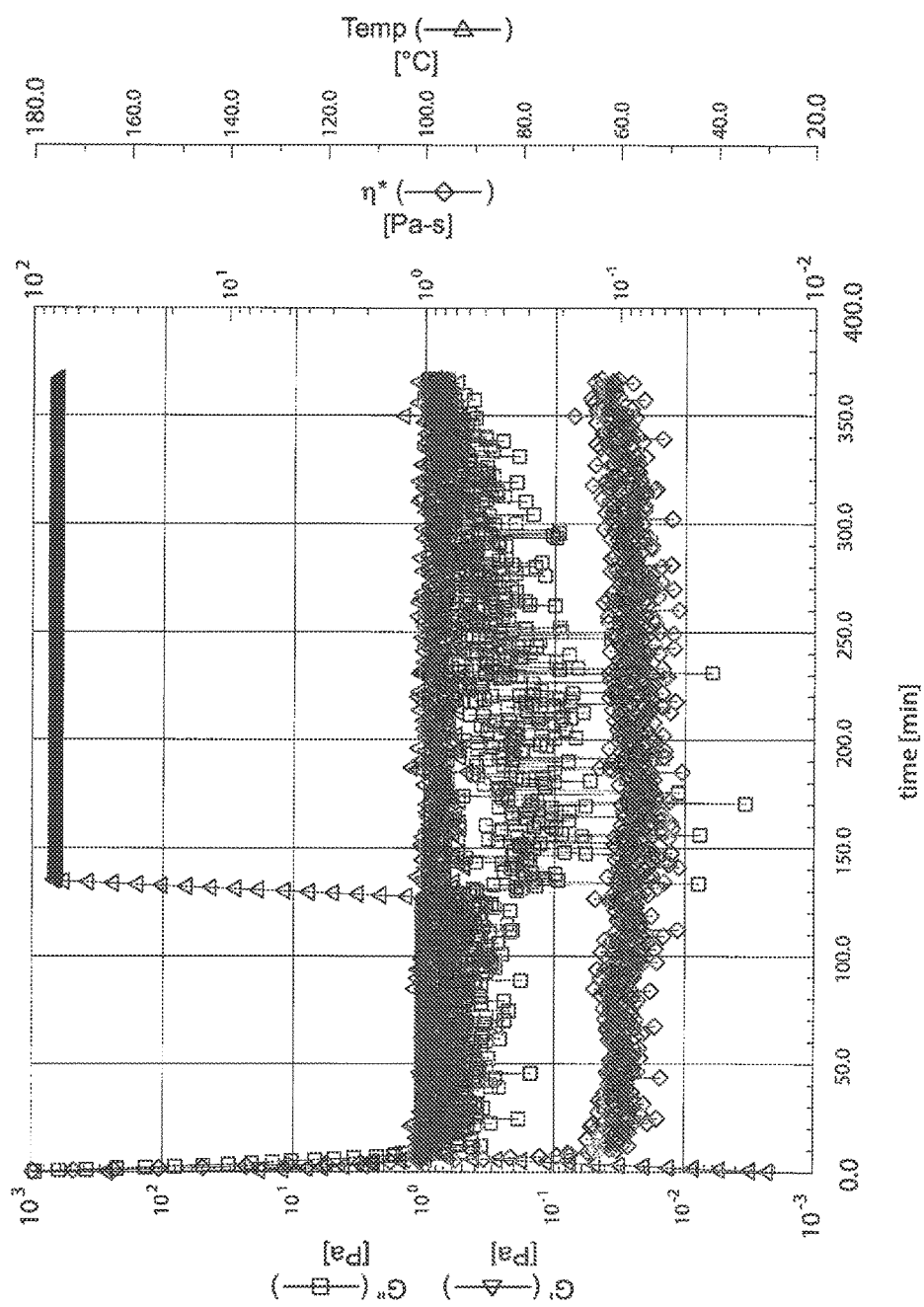
FIG. 4D is a graph showing rheometer results for dry DER 331 mixed with ethacure 100 aldimine protected from p-tolualdehyde.

The traces from the rheometer in FIGS. 4A-D show the trends for viscosity (η*), storage-modulus (G') and loss-modulus (G") for DER 331 epoxy alone (FIG. 4A) and when mixed with an equal molar stoichiometric amount of active ethacure 100 hardener (FIG. 4B), inactive ethacure 100 ketimine (FIG. 4C), and inactive ethacure 100 aldimine (FIG. 4D). All four variables, the viscosity (η*), storage-modulus (G'), loss-modulus (G"), and temperature are functions of time and are shown on the x-axis. Neat DER 331 (FIG. 4A) shows no signs of vitrification during the entire cure cycle confirming that it does not self-polymerize and gives further credibility to the experimental results. The unprotected ethacure 100 (FIG. 4B) shows a steady increase in all three parameters at 100° C. then all parameters spike immediately after the temperature is raised to 175° C. This spike overloads the torque sensor ending the test at 140 min; the sample vitrified (viscosity >40 kPa-s). The protected ethacure 100 ketimine (FIG. 4C) showed no signs of vitrification during the 100° C. heating phase and showed a slow curing progression over approximately three hours before the rheometer reached the torque limit after 330 min of total cure time. The inactive ethacure 100 aldimine (FIG. 4D) showed only slight advancement of the polymer near the end of the curing cycle. The ethacure 100 aldimine remained within the rheometer load limit and was manually stopped after 6 h. The rheometer tests showed that the imine group reduced the extent of the epoxy polymerization in the case of the ketimine, and almost completely blocks polymerization in the case of the aldimine.

Catalytic amounts (0.01 mol) of imidazole or acidic alumina were added to protected resins to study their effect on cure cycle. The rheometer trace from ethacure 100 ketimine mixed with DER 331 and imidazole (FIG. 5A) showed signs of advancement during the first heating phase at 100° C. All parameters steadily rose during the first heating phase and when the second heating phase began at 175° C., all of the parameters continued to increase at a faster rate. After 215 minutes, the rheometer overloaded and the experiment was stopped. The rheometer trace from the ethacure 100 ketimine with DER 331 and acidic alumina (FIG. 5B) as a catalyst, showed no signs of advancement at 100° C. At 175° C., all of the parameters began to increase at a steady rate and continued to progress slowly until the machine overloaded 7 minutes after completing the standard curing cycle.

Figure 6A:
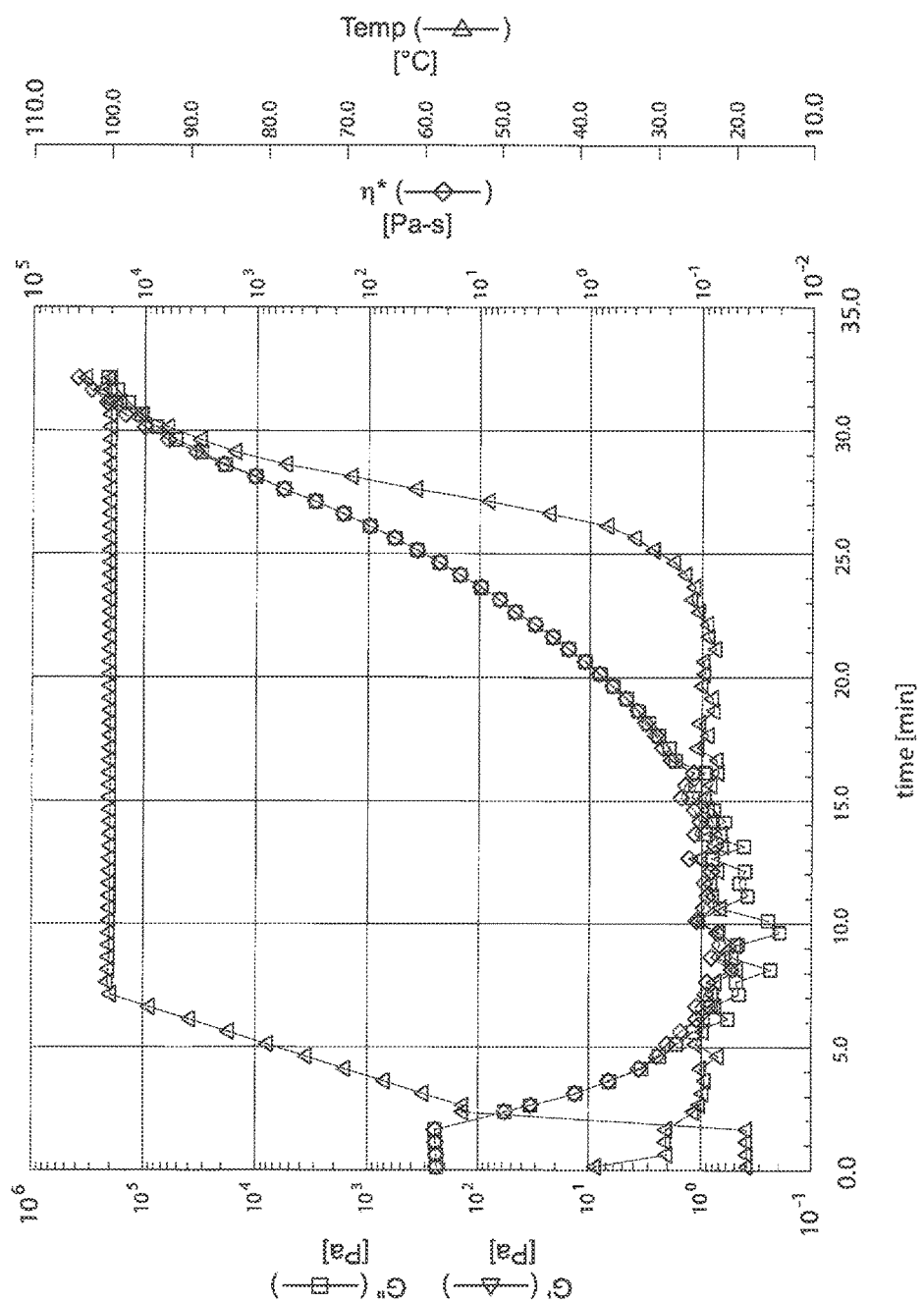
FIG. 6A is a graph showing rheometer results for active m-phenylenediamine when mixed with dry DER 331.
Figure 6B:
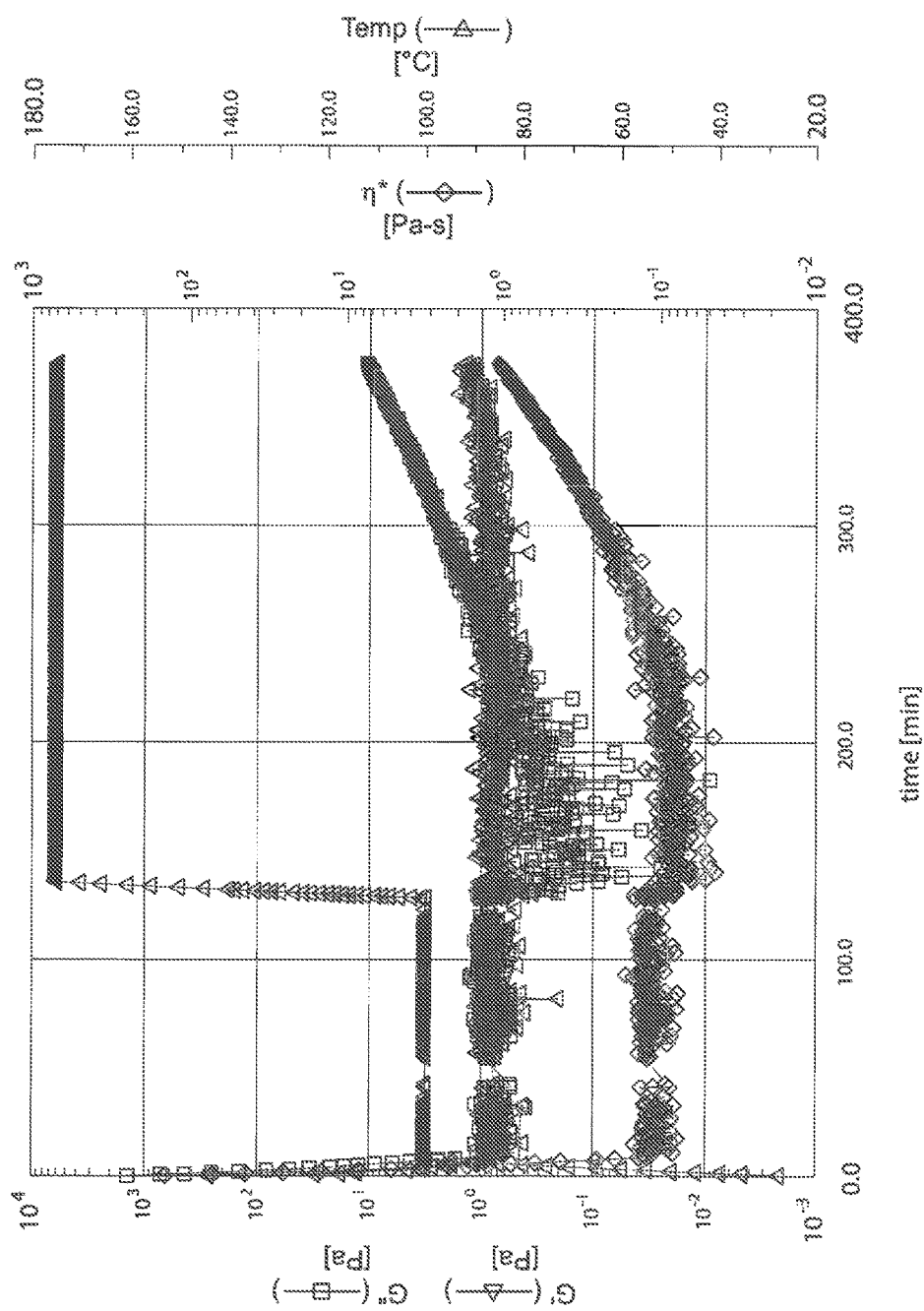
FIG. 6B is a graph showing rheometer results for active m-phenylenediamine aldimine protected from p-tolualdehyde when mixed with dry DER 331.

The active m-phenylenediamine (FIG. 6A) showed all parameters quickly increase at 100° C. overloading the machine at the 33 minute mark. The m-phenylenediamine aldimine (FIG. 6B) shows all parameters remained constant at 100° C. As the temperature increased to 175° C., a slow curing process can be observed. However, the rate of polymerization is not quick enough to overload the rheometer within the curing cycle time frame. The rheometer showed that polymerization was slowed or did not occur when an inactive hardener was mixed with an epoxy.

Example 7—Differential Scanning Calorimetry

After completing the full cure cycle, samples from the rheometer were opened and immediately tested in the Differential Scanning calorimeter (DSC). The glass transition temperature ($T_g$) is the temperature where a material transitions between a glassy, amorphous solid state and a rubbery state. Vitrification is identified as the point at which $T_g$ becomes equal to the increasing curing temperature $T_{cure}$. In cases where the $T_{cure}$ exceeds the $T_g$ of the vitrified resin, devitrification occurs and the resin will result in having a reduced $T_g$. The suppression of the $T_g$ value is important in confirming that the progression of polymerization has been stopped or slowed. This is because as polymerization occurs the molecular weight increases causing a proportional increase of the $T_g$ value. A cured resin with a low $T_g$, can be handled safely and only needs to be heated in order to be a component in the co-cure method. The $T_g$ values in Table 3 were measured in a DSC at a heating rate of 20° C.

TABLE 3

Glass transition temperatures of DER 331 epoxy with various hardeners after the standard cure cycle.

| Hardener/Catalyst mixed with DER 331 | $T_g$ (° C.) |
| --- | --- |
| Ethacure 100 (control) | 173 |
| Ethacure 100 ketimine | 45 |
| Ethacure 100 ketimine, acidic alumina | 80 |
| Ethacure 100 ketimine, imidazole | 108 |
| Ethacure 100 aldimine | 30 |
| m-phenylenediamine (control) | 161 |
| m-phenylenedialdimine | 43 |

In good correlation with the rheometer, the DSC showed a large suppression (128° C.) of the $T_g$ for the ethacure 100 ketimine (45° C.) relative to the active form (173° C.). The acidic alumina rheology was an improvement to the ethacure 100 ketimine, but the $T_g$ was suppressed to a lesser extent (93° C.). Imidazole caused vitrification of the inhibited resin, but the resulting $T_g$ value (108° C.) was lower than the control. When ethacure 100 aldimine was used there was the largest recorded $T_g$ suppression (133° C.). Phenylenediamine aldimine suppressed (118° C.) the $T_g$ to 43° C. relative to the $T_g$ of phenylenediamine (161° C.).

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method for bonding composite substrates comprising:
   providing a first composite substrate and a second composite substrate wherein both the first composite substrate and the second composite substrate are uncured or partially cured and comprise one or more reinforcement fibers and a first curable resin;
   coupling a co-cure prepreg tape onto a faying surface of both the first and second composite substrates wherein the co-cure prepreg tape comprises a second curable resin having one or more chemically protected polymerizable functional groups;
   curing the first and second composite substrates to the co-cure prepreg tape at a first temperature to form a co-cure prepreg tape portion wherein the first and second composite substrates are fully cured and the co-cure prepreg tape is partially cured;
   coupling the co-cure prepreg tape portion of the first composite substrate to the co-cure prepreg tape portion of the second composite substrate;
   applying a second temperature to facilitate deprotection with water and a hydrolysis catalyst of the chemically protected polymerizable functional groups to give unprotected polymerizable functional groups and cure the co-cure prepreg tape portion of the first composite substrate to the co-cure prepreg tape portion of the second composite substrate to form a single covalently bonded composite structure.

2. The method of claim 1, further comprising applying a reflow temperature to the co-cure prepreg tape coupled to the first and second composite substrates before curing at the first temperature.

3. The method of claim 1, wherein:
   the first temperature is from about 75° C. to about 250° C. and the second temperature is from about 75° C. to about 250° C.

4. The method of claim 1, wherein:
   the first curable resin comprises an epoxide and an amine.

5. The method of claim 1, wherein:
   the second curable resin comprises an epoxide and a chemically protected polymerizable amine.

6. The method of claim 1, wherein:
   the one or more chemically protected polymerizable functional groups is an aldimine.

7. The method of claim 1, wherein:
   the one or more chemically protected polymerizable functional groups is an ketimine.

8. The method of claim 1, wherein:
   the unprotected polymerizable functional groups are an amine.

9. The method of claim 8, wherein:
   the amine is 4,6-diethyl-2-methylbenzene-1,3-diamine.

10. The method of claim 1, wherein:
    the hydrolysis catalyst is selected from the group consisting of acidic alumina, imidazole, and combinations thereof.

11. A method for bonding composite substrates comprising:
    providing a co-cure prepreg layer cured to a surface of both a first composite substrate and a second composite substrate wherein the co-cure prepreg layer comprises a chemically protected polymerizable functional group;
    coupling a portion of the co-cure prepreg layer cured to the first composite substrate to a portion of the co-cure prepreg layer cured to the second composite substrate;
    applying a deprotection initiator to deprotect the protected polymerizable functional group of the co-cure prepreg layers and to couple the co-cure prepreg layers of the first and second composite substrates, to form a single covalently bonded composite structure.

12. The method of claim 11, wherein:
    the deprotection initiator comprises a heat source, a chemical reagent, a light source, a mechanical force, or a combination thereof.

13. The method of claim 11, wherein:
    the first and second composite substrates comprise a curable resin material having an amine and an epoxide.

14. The method of claim 11, wherein:
    the first and second composite substrates comprise one or more reinforcement fibers.

15. The method of claim 1, wherein:
    the chemically protected polymerizable functional groups is an aldimine.

16. The method of claim 11, wherein:
    the chemically protected polymerizable functional groups is an ketimine.

17. The method of claim 11, wherein:
    the single covalently bonded composite structure comprises a crosslinked amine-cured epoxy polymer network.

18. A co-curable composite structure comprising:
    a first and a second uncured or partially cured composite substrate comprising a first curable resin wherein the first curable resin comprises a first epoxide and an amine;
    a first co-cure prepreg layer coupled to a surface of the first uncured or partially cured composite substrate and a second co-cure prepreg layer coupled to a surface of the second uncured or partially cured composite substrate wherein the first and the second co-cure prepreg layers comprises a second curable resin having a second epoxide and a chemically protected amine;
    wherein the first and the second uncured or partially cured composite substrate and the first and the second co-cure prepreg layers are cured together at a first temperature until the amines of the first and the second uncured or partially cured composite substrate are functionally fully cured; wherein the first co-cure prepreg layer of the first composite substrate is coupled to the second co-cure prepreg layer of the second composite substrate to form the co-curable composite structure; and
    wherein the chemically protected amine of the first and the second co-cure prepreg layers are partially cured and remains latent until an additional deprotection and co-cure step.

19. The co-curable composite structure of claim 18, wherein:
    the chemically protected amine is an aldimine.

20. The co-curable composite structure of claim 18, wherein:
    the chemically protected amine is a ketimine.

* * * * *